Figure 1:
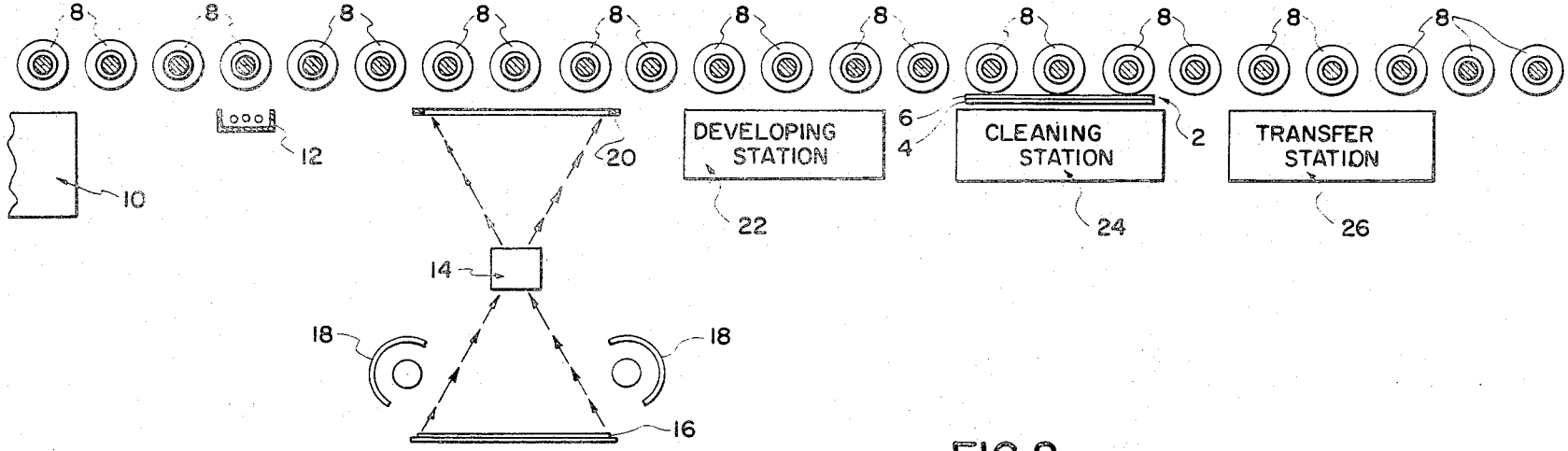
Figure 2:
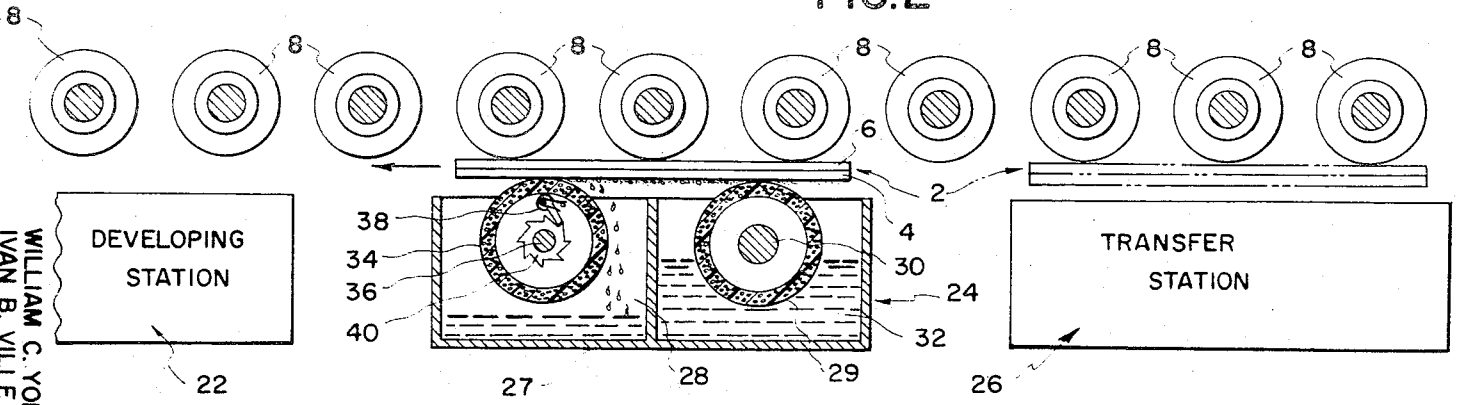
Figures 3, 4, 5:
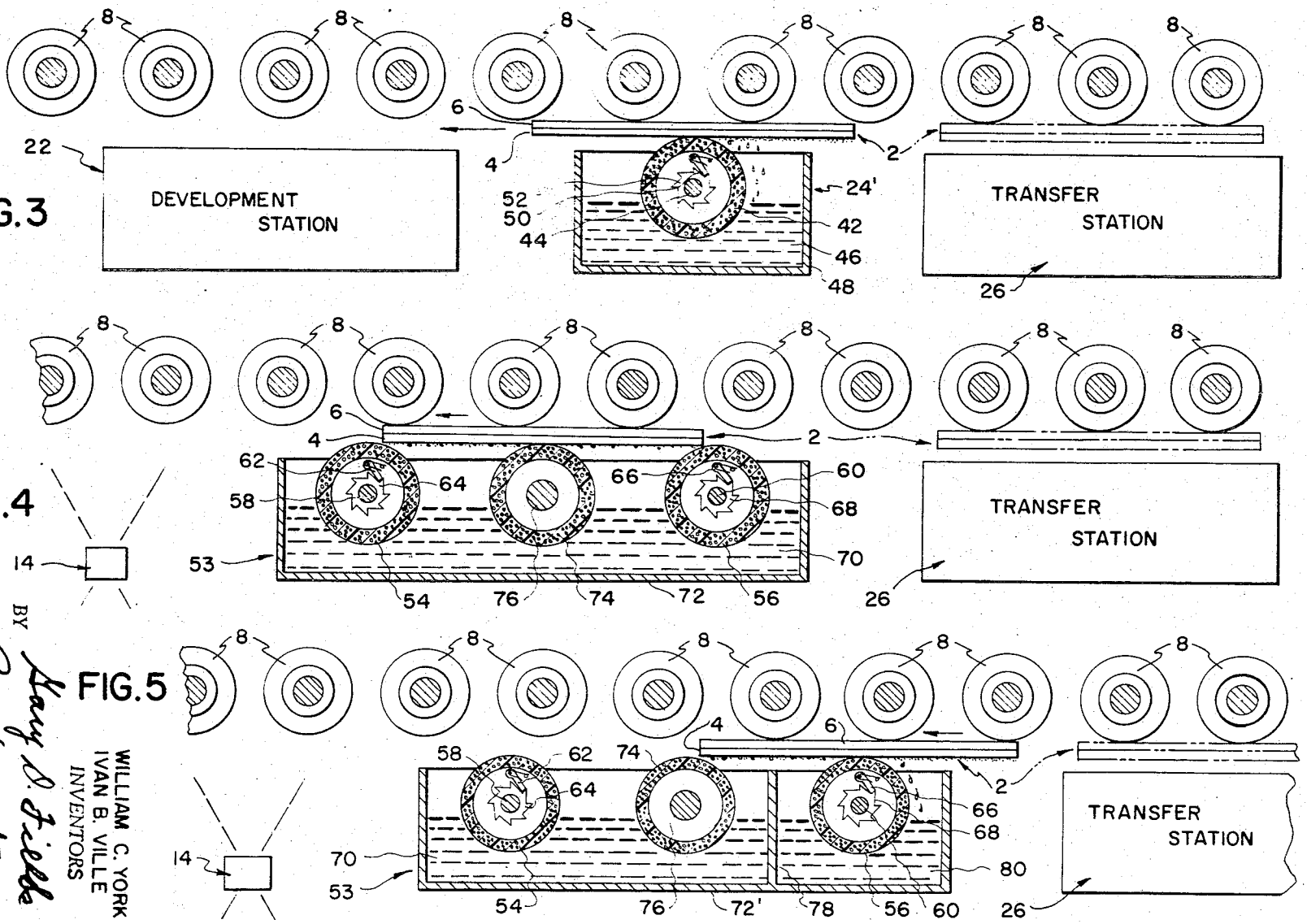

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 7, 1972

896 O.G. 17

T896,011

CLEANING METHOD AND APPARATUS FOR REMOVING DEVELOPER FROM PHOTOSENSITIVE ELEMENTS

William C. York, Rochester, and Ivan B. Ville, Spencerport, N.Y. (both % Kodak Park, 1669 Lake Ave., Rochester, N.Y. 14615)

Filed Dec. 14, 1970, Ser. No. 97,757

Int. Cl. G03g *13/10, 15/10*

U.S. Cl. 117—37 LE

2 Sheets Drawing. 15 Pages Specification

A roller of soft absorbent, open celled, plastic material such as polyurethane is provided to remove the residual developer image from a liquid developed photoconductive surface after image transfer. In one embodiment such roller is free to rotate as the photoconductive member passes thereover in a first direction towards the transfer station, but is prevented from rotation during passage of the element thereover in the reverse direction after trans-

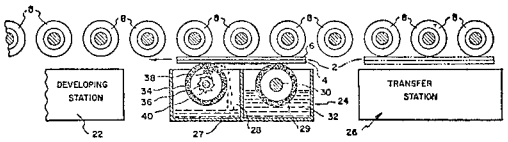

fer. Another embodiment utilizes a single such roller both to apply developer during movement towards the transfer station and to remove residual developer during reverse movement. Other embodiments utilize various arrangements of such rollers to develop and clean the photoconductive element in conjunction with a supply of carrier solution such as Isopar G.

March 7, 1972 W. C. YORK ET AL T896,011

CLEANING METHOD AND APPARATUS FOR REMOVING DEVELOPER FROM PHOTOSENSITIVE ELEMENTS

Filed Dec. 14, 1970 2 Sheets-Sheet 1

WILLIAM C. YORK
IVAN B. VILLE
INVENTORS

BY Gary D. Fields
R. W. Hampton
ATTORNEYS

March 7, 1972 W. C. YORK ET AL T896,011

CLEANING METHOD AND APPARATUS FOR REMOVING DEVELOPER FROM PHOTOSENSITIVE ELEMENTS

Filed Dec. 14, 1970 2 Sheets-Sheet 2

WILLIAM C. YORK
IVAN B. VILLE
INVENTORS

BY Gary D. Fields
R. W. Hampton
ATTORNEYS